United States Patent

[11] 3,547,142

[72] Inventor Brian C. Webb
732 South 95th East Ave., Tulsa, Okla. 74112
[21] Appl. No. 794,134
[22] Filed Jan. 27, 1969
[45] Patented Dec. 15, 1970

[54] PIPELINE STATION BYPASS DEVICE
7 Claims, 3 Drawing Figs.

[52] U.S. Cl. ..................................................... 137/268, 15/104.06
[51] Int. Cl. ..................................................... F17d 3/02
[50] Field of Search............................................ -
137/02001970; 15/104.06, 104.06A, ; 134/8

[56] References Cited
UNITED STATES PATENTS
| | | | |
|---|---|---|---|
| 3,047,020 | 7/1962 | Barrett, Jr., ................... | 15/104.06X |
| 3,146,477 | 9/1964 | Bergman, et al.............. | 137/268X |
| 3,246,666 | 4/1966 | Park III. et al. ........... | 15/104.06X |

FOREIGN PATENTS
| | | |
|---|---|---|
| 3,246,666 | 4/1966 | ..................................... |

Primary Examiner—M. Cary Nelson
Assistant Examiner—Robert J. Miller
Attorney—Head and Johnson ABSTRACT: A pipeline fluid handling station bypass device for pigs, scrapers, etc. are transferred from the low pressure side to the high pressure side without interfering with the station operating equipment.

3,547,142

PIPELINE STATION BYPASS DEVICE

BACKGROUND

This invention relates to the internal pipeline brushing, scrubbing and general cleaning art and in particular to implements and fluid handling devices used in connection therewith.

In the transportation of fluids through a pipeline, pumps, compressors, processing or other fluid handling devices are placed at certain intervals or stations to move or treat the fluids. Quite often, during the operation of these pipelines, it is necessary to insert devices such as pigs, spheres or other devices for cleaning the pipe interior or as a means to separate various types of fluids, such devices being moved through the pipeline by the fluid pressure. It is desirable that the pipeline pig, scraper, etc., not pass through the booster station pump or compressor and to prevent the debris or material scraped ahead of the pig from entering into the pump or compressor.

Prior artisans such as U.S. Pat. No. 3,212,116 have taught pipeline scraper bypassing systems but have involved an intricate system of bypass lines, and check valves, which may jam and thus interrupt the normal operation of the pipeline flow system by costly shut down time.

SUMMARY

This invention provides an apparatus for overcoming the problems heretofore known in the prior art. The bypass device of this invention is installed relative to a booster or other fluid handling or treating station yet will permit uninterrupted fluid flow thereto. The device basically comprises a cylinder housing within which a piston is movable from one side to the other upon signal actuated by the pipeline pig or other device, and which traverses the pig across the station equipment into the outlet.

DESCRIPTION OF THE PREFERRED EMBODIMENTS

Figure 1:
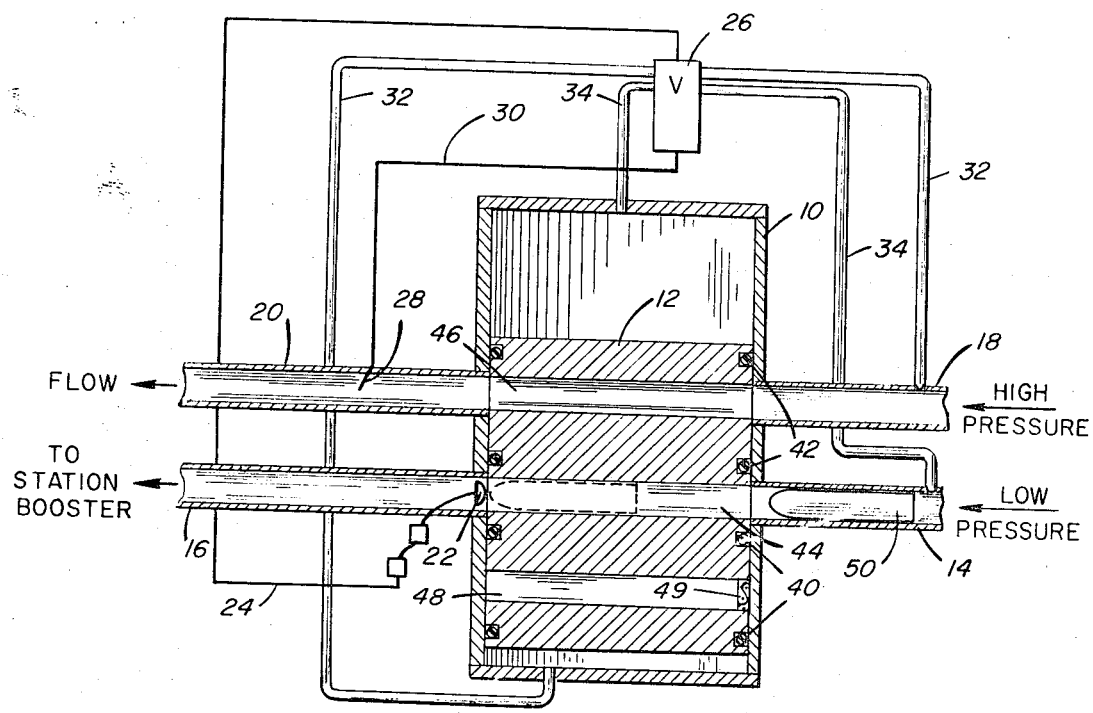
FIGS. 1 and 2 are sectional views showing the basic operation and structure of this invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The station bypass device of this invention basically comprises a housing 10 within which a piston means 12 is reciprocable. Pipeline inlet 14 and outlet 16 are interconnected to the cylinder housing 10 for axial flow to a fluid booster pump 17, fluid treating system or other fluid handling devices. For purposes of description, this is the low pressure side of the station. The outlet from the station is of relatively higher pressure which connects to the housing 10 via conduit 18 thence out through conduit 20. In some instances fluid bypass and check valve flow conduits 19 and 21 are provided as an alternate flow system.

A signaling device 22 is positioned within the low pressure flow conduit and is interconnected by line 24 to operate a valve 26. The device is positioned so as to actuate only after the pig 50 has reached a proper position in piston 12. Similarly a signal means 28 in outlet line 20 is interconnected through a signal line 30 to operate the valve in another direction. Means 28, in this instance, is positioned to be actuated after the pig has sufficiently cleared the piston. Fluid conduit 32 interconnects from the high pressure line 18 to and through the valve 26 into the space on the lower side of the piston 12. Similarly a conduit 34 connected to the low pressure line interconnects through the valve to the upper or opposite side of piston 12.

The piston 12 includes a plurality of seals 40 and 42 to maintain separation across passage 44, 46 and 48. Passage 44 is the primary pig receiving and transfer conduit. Conduits 46 and 48 are relief conduits. That is, when passage 44 is in the receiving position as in FIG. 1, conduit 46 is aligned with the high pressure outlet flow 18 and 20. Similarly, when the passage 44 is aligned with outlet 18 and 20, conduit 48 is aligned with the low pressure inlet 14 and 16. In some instances screen or bars 49 extend across the conduit to stop following pig members 51 yet allow flow forwardly thereof.

OPERATION

Figure 2:
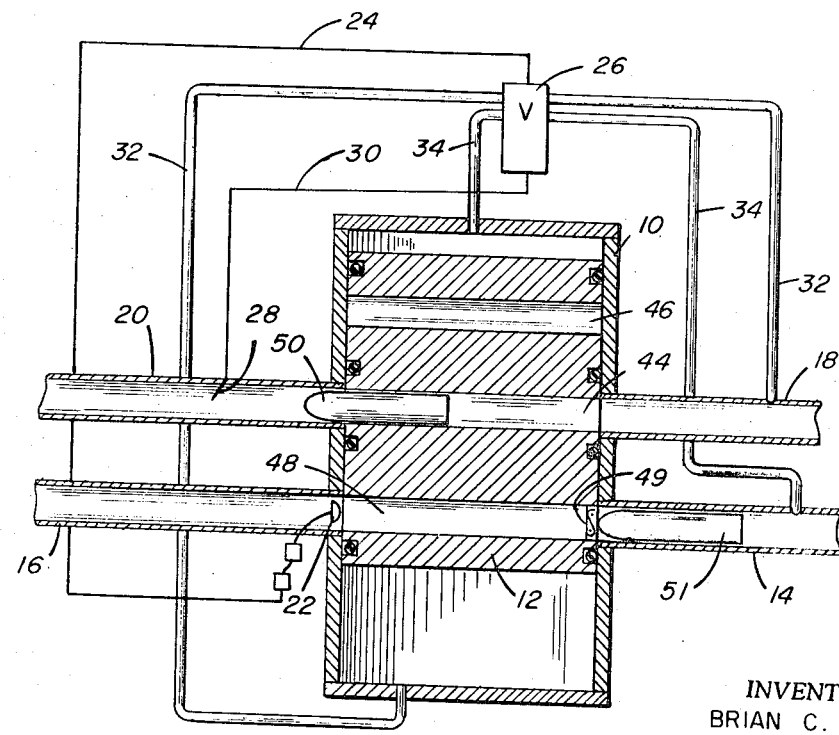

In operation, piston 12 is in the position substantially shown in FIG. 1 ready to receive a pig or sphere 50 which by flow pressure, enters the piston passage 48 into a position substantially shown by the dotted lines. At that point the pig strikes switch 22 sending a signal through conduit 24 to the valve 26. The valve permits high pressure fluids from line 18 into conduit 32 to enter bottom of the cylinder or housing 10 forcing the piston 12 upward. At the same time fluids are being exhausted from the cylinder above the piston 12 through the valve 26 via conduit 34 into the low pressure line. This fluid action causes the piston 12 to travel upwardly to a position substantially shown in FIG. 2 wherein the conduit 44, containing the pig 50, is now axially aligned with the high pressure flow line 18, the flow of which now causes the pig 50 to travel outward into the pipeline 20. Upon sufficient travel the pig will strike a switch 28 sending a signal to the valve 26 wherein the flow is reversed. That is, high pressure fluid will now travel through conduit 32 through the valve 26 and conduit 34 to move the piston 12 downward to the original receiving position ready to receive an additional pig 51 as shown in FIG. 1. At the same time fluids are exhausted from beneath the piston 12 through the valve 26 via conduit 32.

Figure 3:
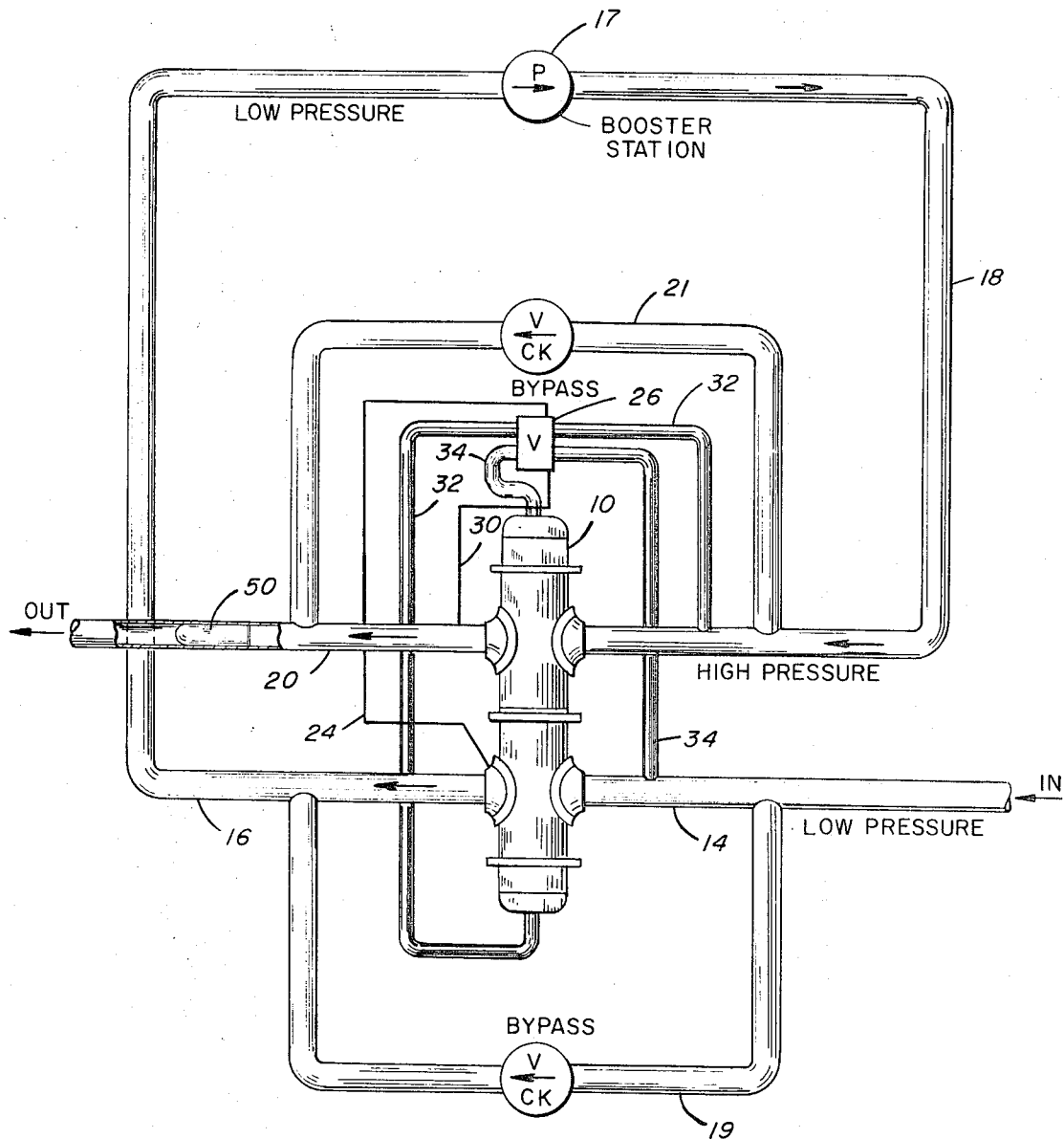
FIG. 3 is a piping diagram showing a typical installation.

In many instances, as shown in FIG. 3, appropriate fluid bypass lines 19 and 21 are necessary around the pig transfer device, especially in the event a plurality of pigs are being used, for example, when a second pig reaches the transfer piston while it is in the upper position. Although check valves are shown in the bypass lines 19 and 21 it is understood that regulators may be used to maintain a pressure drop across the housing 10. This will insure the entrance of the pig into the piston receiving cavity and its exit therefrom.

As used herein the term "fluid handling stations" shall include pump or compressor booster equipment, or equipment placed in or across a pipeline to treat or process the fluid being transferred along the pipeline.

Valve 26 as shown herein may be actuated either pneumatically, hydraulically or electrically via appropriate signaling systems 24 and 30 which will create substantially snap action movement of piston 12.

I claim:

1. A pipeline pig bypass device for a fluid handling station having a pressure differential thereacross comprising:
   a fluid inlet conduit to said station and an outlet conduit from said station;
   a housing positioned to be across said input and outlet conduits;
   a piston movable in said housing, said piston having at least one pig receiving conduit alignable with either said inlet or said outlet, means to seal said conduit from that conduit not aligned;
   a valve;
   fluid conduit means connecting each side of said piston with said valve;
   fluid conduit means connecting said valve with said inlet, and with said outlet;
   control means actuating said valve upon receipt of a pig in said piston, to communicate high pressure fluids on one side of said piston and exhaust from the other to move said piston and pig receiving conduit into alignment with said outlet and, upon removal of said pig, communicate high pressure fluids to said other side of said piston and exhaust from said one side to move said piston and pig receiving conduit back into alignment with said inlet.

2. A bypass device according to claim 1 including:
a first relief passage in said piston aligned with said outlet when said pig receiving conduit is aligned with said inlet; and
a second relief passage in said piston aligned with said inlet when said pig receiving conduit is aligned with said outlet.

3. A device of claim 1 including:
a unidirectionally controlled bypass conduit connecting said inlet around said housing; and
a unidirectionally controlled bypass conduit connecting said outlet around said housing.

4. A bypass device according to claim 1 wherein said station is a fluid pump booster station and said inlet is at a relative low fluid pressure to said outlet which is at a higher fluid pressure.

5. A bypass device according to claim 4 including:
a first relief passage in said piston aligned with said high pressure outlet when said pig receiving conduit is aligned with said low pressure inlet; and
a second relief passage in said piston aligned with said low pressure inlet when said pig receiving conduit is aligned with said high pressure outlet.

6. A device of claim 4 including:
a unidirectionally controlled bypass conduit connecting said low pressure inlet around said housing; and
a unidirectionally controlled bypass conduit connecting said high pressure outlet around said housing.

7. A bypass device according to claim 1 wherein said station is a fluid treating station and said inlet is at a relative high fluid pressure to said outlet which is at a lower fluid pressure.